(12) United States Patent
Sistare et al.

(10) Patent No.: US 7,424,712 B1
(45) Date of Patent: Sep. 9, 2008

(54) SYSTEM AND METHOD FOR CONTROLLING CO-SCHEDULING OF PROCESSES OF PARALLEL PROGRAM

(76) Inventors: Steven J. Sistare, 13 Magnolia Dr., Westford, MA (US) 01886; Nicholas J. Nevin, 19 Taft Ave., Maynard, MA (US) 01754; Anthony L. Kimball, RR2 Box 290, Fergus Falls, MN (US) 56537

( * ) Notice: Subject to any disclaimer, the term of this patent is extended or adjusted under 35 U.S.C. 154(b) by 0 days.

(21) Appl. No.: 09/303,464

(22) Filed: Apr. 30, 1999

(51) Int. Cl.
*G06F 9/00* (2006.01)

(52) U.S. Cl. ...................... 718/102; 718/103

(58) Field of Classification Search ............... 709/105, 709/312, 101, 103, 203, 328; 707/8; 370/398; 718/101, 102, 103, 104; 719/310
See application file for complete search history.

(56) References Cited

U.S. PATENT DOCUMENTS

| | | | | |
|---|---|---|---|---|
| 4,783,734 A | * | 11/1988 | May et al. | 709/313 |
| 4,965,718 A | * | 10/1990 | George et al. | 718/104 |
| 5,287,508 A | | 2/1994 | Hejna, Jr. et al. | |
| 5,630,128 A | | 5/1997 | Farrell et al. | |
| 5,752,031 A | * | 5/1998 | Cutler et al. | 709/103 |
| 5,933,604 A | * | 8/1999 | Inakoshi | 709/226 |
| 6,108,701 A | * | 8/2000 | Davies et al. | 709/224 |
| 6,154,129 A | * | 11/2000 | Kajitani et al. | 340/506 |
| 6,289,369 B1 | | 9/2001 | Sundaresan | |
| 6,363,467 B1 | * | 3/2002 | Weeks | 711/170 |
| 6,601,111 B1 | * | 7/2003 | Peacock et al. | 719/310 |

OTHER PUBLICATIONS

Arthur Dumas, Programming WinSock 1995, Sams Publishing, p. 44-53.*

James L. Conger, Windows API Bible 1992, The Waite Group, Inc., pp. 9-10 and 611-614.*

"Communication-Driven Scheduling" Incorporating Parallel Jobs Into the UNIX Environment, Dusseau, University of California, Berkeley, CA, Computer Science Division.

"Effective Distributed Scheduling of Parallel Workloads", Dusseau, et al, *Sigmetrics,* 96-5/96, Philadelphia, PA, 1996.

"Extending Proportional-Share Scheduling to a Network of Workstations", Arpaci-Dusseau, et al, University o California, Berkeley, CA, Computer Science Division.

"The Interaction of Parallel and Sequential Workloads on a Network of Workstations", Arpaci, et al, *Sigmetrics,* 95, Philadelphia, PA, 1995.

"Re-examining Scheduling and Communication in Parallel Programs", Dusseau, et al, University of California Berkeley, CA, Computer Science Division.

"Scheduling with Implicit Information in Distributed Systems", Arpaci-Dusseau, et al, *Sigmetrics '98/Performance '98 Joint Conference on the Measurement and Modeling of Computer Systems,* Madison W Jun. 1998.

* cited by examiner

*Primary Examiner*—William Thomson
*Assistant Examiner*—Andy Ho

(57) ABSTRACT

A system is described for controlling co-scheduling of processes in a computer comprising at least one process and a spin daemon. The process, when it is waiting for a flag to change condition, transmits a flag monitor request to the spin daemon and enables itself to be de-scheduled. The spin daemon, after receiving a flag monitor request, monitors the flag and, after the flag changes condition, enables the process to be re-scheduled for execution by the computer. Since the spin daemon can monitor flags for a number of processes, the ones of the processes that are waiting will not need to be executed, allowing other processes that are not just waiting to be processed more often.

20 Claims, 5 Drawing Sheets

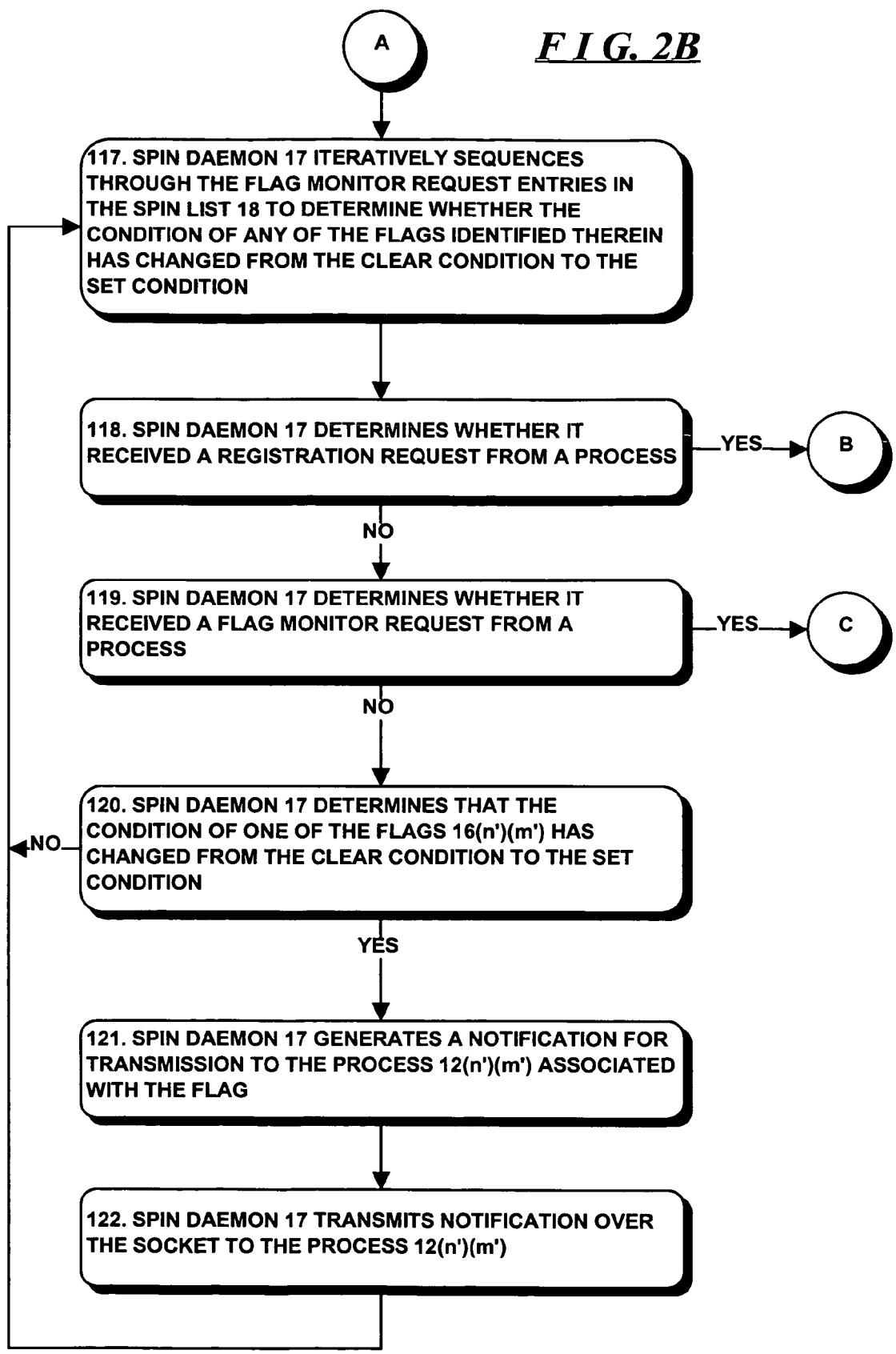

123. PROCESS 12(n')(m') RECEIVES THE NOTIFICATION TRANSMITTED IN STEP 122

124. PROCESS 12(n')(m') RE-SCHEDULES ITSELF

*FIG. 2C*

SYSTEM AND METHOD FOR CONTROLLING CO-SCHEDULING OF PROCESSES OF PARALLEL PROGRAM

FIELD OF THE INVENTION

The invention relates generally to the field of digital computer systems, and more particularly to systems and methods for scheduling of processes or threads for execution by a computer. The invention particularly provides a system and method for efficiently scheduling of processes or threads comprising a parallel job for execution on a computer having a plurality of processors, such as a computer constructed according to a symmetric multi-processor architecture, a cluster of such computers, or the like.

BACKGROUND OF THE INVENTION

Computers typically execute programs in one or more processes or threads (generally "processes") on one or more processors. If a program comprises a number of cooperating processes which can be processed in parallel on a plurality of processors, problems arise in connection with scheduling execution of the processes so that the programs can be executed in an efficient manner. Typically, operating systems have scheduled processes without regard to whether they comprise part of a parallel program, which can lead to severe inefficiencies in execution. For example, if one process in a parallel program is waiting for data that is to be provided by another process in the parallel program, or perhaps from another program, if the operating system enables the waiting process to be executed before the process which is to supply the data has provided the data, the time during which the waiting process is executed will be wasted. The problem is exacerbated when the computer is processing several such parallel programs contemporaneously, and the total number of processes of all parallel programs is greater than the number of processors in the computer available for executing those processes.

Several methodologies have been developed for scheduling execution of processes comprising one or more parallel programs. In one methodology, referred to as "batch-queuing," the computer executes processes of only one parallel program at a time, and executes those processes until all are completed. However, batch-queuing generally precludes sharing of the computer in an interactive manner.

In another methodology, referred to as "gang scheduling," the computer also executes processes of only one parallel program at a time, but allows for interactivity. In a computer which implements the gang scheduling methodology, a master entity, forming, for example, part of the operating system, periodically determines which parallel program to schedule at any point in time. Preferably, the master entity will make such determinations at frequent, regular intervals. At the beginning of each interval, the master entity selects which parallel program is to be processed during the interval, and allow all of the processes of only the selected program to be executed during the interval. At the end of the interval, the master entity will stop execution of that program and select another program to be executed. This methodology allows for interactivity with the various programs being executed, but the master entity adds a not-inconsiderable amount of processing overhead. The overhead can be reduced by making the intervals longer. However, if the intervals are made longer, the interactivity response time can be relatively poor. In addition, with this methodology it is not possible to process two parallel programs that communicate with each other since they will never be scheduled for execution at the same time.

In a third methodology, referred to as "co-scheduling," each process, while it is being executed, determines for itself whether it is to be scheduled for execution, or to de-schedule itself. The processes can make the determination based on a number of factors, such as, for example, its communication patterns, responsiveness of other processes to requests, whether it is waiting for information from another process, and the like. For example, if a process determines that it has been waiting too long for information from another process, it (that is, the waiting process) can de-schedule itself, so that it will not be executed. This allows execution of other processes, which are not similarly waiting for information and which therefore can make progress in their processing operations. Since each process determines whether it is to be scheduled, no master entity is required to make such scheduling decisions. In addition, since a computer can be executing the processes comprising multiple programs, the methodology allows for a high degree of interactivity and execution of multiple parallel programs that communicate with each other.

SUMMARY OF THE INVENTION

The invention provides a new and improved system and method for efficiently controlling scheduling of execution of processes or threads comprising one or more parallel programs in a computer having a plurality of processors, such as a computer constructed according to a symmetric multi-processor architecture or a cluster of such computers.

In brief summary, A system is described for controlling co-scheduling of processes in a computer comprising at least one process and a spin daemon. Each process, when it is waiting for a flag to change condition, can transmit a flag monitor request to the spin daemon and enable itself to be de-scheduled. The spin daemon, after receiving a flag monitor request, monitors the flag and, after the flag changes condition, enables the process to be re-scheduled for execution by the computer.

Since the spin daemon can monitor flags for a number of processes, the ones of the processes that are waiting will not need to be executed, allowing other processes that are not just waiting to be processed more often.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
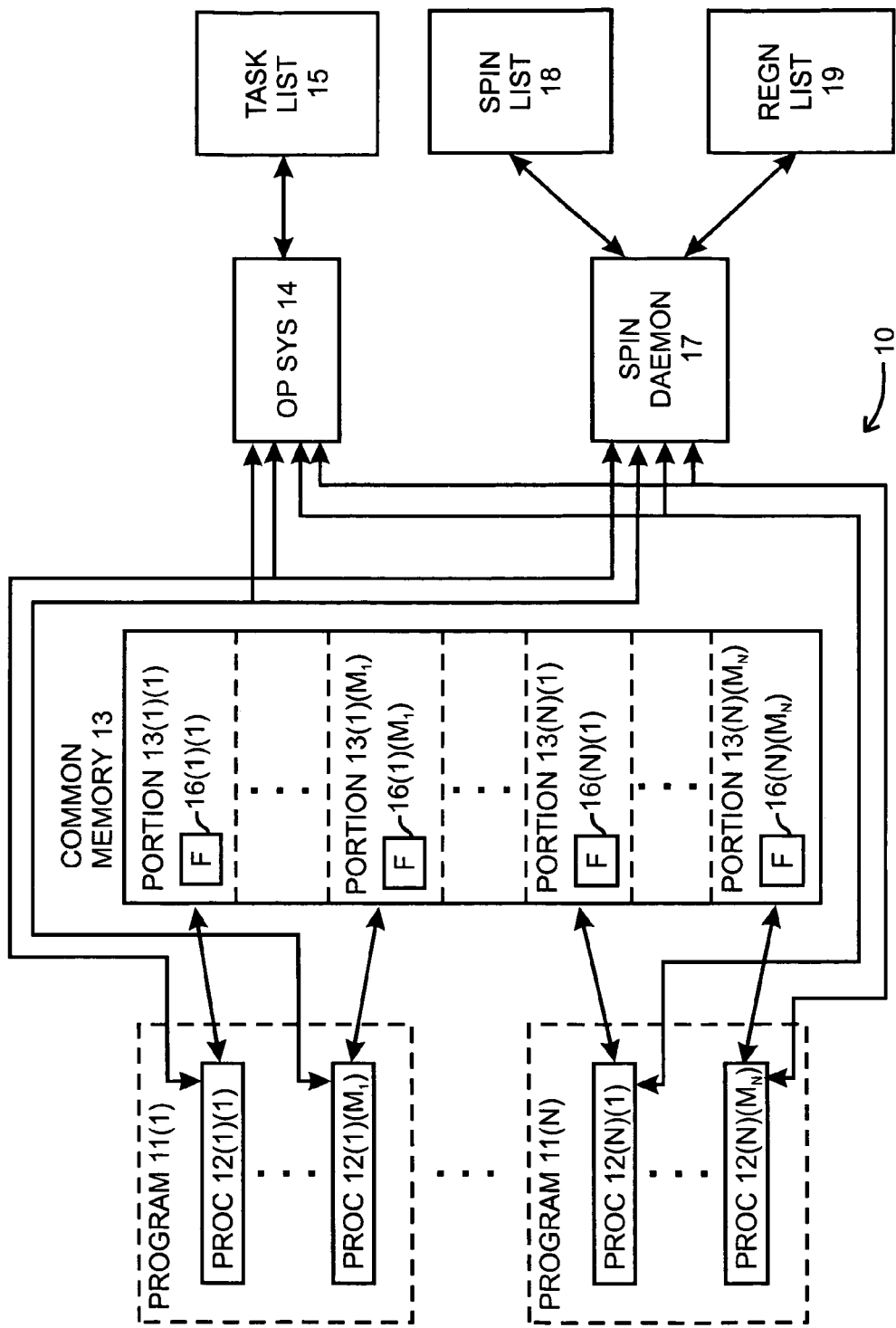
FIG. 1 schematically depicts a computer system including an arrangement for efficiently controlling scheduling of processes or threads comprising one or more parallel programs in a compute having a plurality of processors, constructed in accordance with the invention.

FIG. 1 schematically depicts a computer 10 including an arrangement for efficiently controlling scheduling of processes or threads comprising one or more parallel programs in a compute having a plurality of processors, constructed in accordance with the invention. Generally, the computer 10 includes hardware resources which are preferably constructed along the lines of a symmetric multi-processor architecture, in which a plurality of processors (not separately shown) share common memory resources (also not separately shown), or a cluster of such computers. In the computer 10 depicted in FIG. 1, a plurality of programs 11(1) through 11(N) (generally identified by reference numeral 11($n$)), each comprising one or more processes 12(1)(1) through 12(N)(M) (generally identified by reference numeral 12($n$)($m$)). The processes 12($n$)($m$) share a common memory 13, with each process being allocated a portion 13($n$)($m$) of the memory 13. The total number of processes which the computer system 10 will execute may be greater than the total number of processors in the computer system 10, and, if so, the computer's operating system 14 will enable the processes to be executed in a series of time intervals or slots, with the particular ones of the processes that be executed during a time slot being listed on a task list 15. When a process 12($n$)($m$) is listed on the task list, it can be "scheduled" for execution, on the other hand, when a process 12($n$)($m$) is not listed on the task it has been "de-scheduled" and the operating system 14 will not enable it to be executed until it is again scheduled. At the end of each time slot, the operating system selects the processes that are to be executed from among those that are listed on the task list 15.

As noted above, each process 12($n$)($m$) is allocated a portion 13($n$)($m$) of the common memory 13, which it will normally use in its processing operations. Each process 12($n$)($m$) can, however, communicate with another process 12($n'$)($m'$) (where one or both of "n'" and "m'" will differ from "n" and "m") by sending messages thereto. The messages effectively result in the storing of information in the memory portion 13($n'$)($m'$) of memory 13 allocated to that process 12($n'$)($m'$). A process may communicate with another process for several reasons. For example, a process may communicate with another process to request that the other process provide it with information which it may need in its processing operations. In that situation, after the process receiving the processing request, it (that is, the process which receives the processing request) will at some point perform the processing operations to generate the requested information. After the information has been generated, the process which generated the information can provide the information to the process that generated the request. In both cases, the process loads information (either the information generation request or the generated information) into the memory portion of the process which is to receive the information. Thus, if one process 12($n$)($m$) is requesting information from another process 12($n'$)($m'$), it (that is, process 12($n$)($m$)) will load the request into the memory portion 13($n'$)($m'$) associated with the other process. Similarly, if one process 12($n$)($m$) is loading information requested by another process 12($n'$)($m'$), it (that is, process 12($n$)($m$) will load the requested information into the memory portion 13($n'$)($m'$) associated with the other process. In addition, if the information is in response to a request, the process 12($n$)($m$) will set a flag 16($n'$)($m'$) in the memory portion 13($n'$)($m'$) to indicate that it has stored the information in the memory portion 13($n'$)($m'$). Thereafter, the process 12($n'$)($m'$) can make use of the information that has been loaded into its memory portion 13($n'$)($m'$) by process 12($n$)($m$) and, at some point, reset the flag 16($n'$)($m'$).

If the process 12($n'$)($m'$) is waiting for information from the process 12($n$)($m$), which may occur after it issues a processing request to the process 12($n$)($m$), it (that is, process 12($n'$)($m'$)) will perform a "spin-wait" loop in which it periodically tests the flag 16($n'$)($m'$). While performing the spin-wait loop, the process 12($n'$)($m'$) will need to delay performing other processing operations until the process 12($n$)($m$) has loaded the information in its memory portion 13($n'$)($m'$) and set the flag 16($n'$)($m'$). It will be appreciated that, while the process 12($n'$)($m'$) is in the spin-wait loop, it is not performing processing operations, and so time that it is performing the spin-wait loop will essentially be wasted. The process 12($n$)($m$) may be delayed in providing the information required by process 12($n'$)($m'$) for a number of reasons, including, for example, that it is not being executed by the computer 10 in the current time slot, that it is not scheduled for execution, that the process 12($n$)($m$) needs a relatively long time to generate the information to be provided, and other reasons which will be apparent to those skilled in the art. To reduce the amount of processing time that may be wasted by the process 12($n'$)($m'$) executing the spin loop, the computer 10 also includes a spin daemon 17 which, after receiving a flag monitor request therefor from the process 12($n'$)($m'$), can monitor the condition of the flag 16($n'$)($m'$) for the process 12($n'$)($m'$). The process 12($n'$)($m'$), after issuing the flag monitor request to the spin daemon 17, can thereafter de-schedule itself, by removing its identification from the task list 15, and provide a notification to the operating system 14 giving up any remaining portion of its current time slot. After the process 12($n'$)($m'$) gives up any remaining portion of its time slot, the operating system 14 can initiate execution of another process 12($n''$)($m''$) (where one or both of n'' and m'' will differ from n' and m') during that time. In addition, since the process 12($n'$)($m'$) has de-scheduled itself, the operating system 14 will not again enable the process 12($n'$)($m'$) to thereafter be executed.

After receiving the flag monitor request from the process 12($n'$)($m'$), the spin daemon 17 will add the flag monitor request to a spin list 18 which it maintains. The spin list 18 identifies the flags in memory whose condition it is to monitor. Accordingly, after the spin daemon 17 adds the flag monitor request to the spin list 18, it will thereafter monitor the condition of the flag 16($n'$)($m'$). When the process 12($n$)($m$) sets the flag, indicating that it has provided the information required by process 12($n'$)($m'$), the spin daemon 17 will enable the process 12($n'$)($m'$) to, in turn, enable the operating system 14 to re-schedule the process 12($n'$)($m'$) by re-loading its identification on the operating system task list 16. The operating system 14 can thereafter enable the process 12($n'$)($m'$) to be executed in the same manner as before it had de-scheduled itself. Since by the time the process 12($n'$)($m'$) is re-scheduled, the process 12($n$)($m$) will have provided the information required by process 12($n'$)($m'$), it (the process 12($n'$)($m'$)) will be able to make progress in its processing operations, using the information provided by the process 12($n$)($m$), and will not need to return to spin-wait loop.

It will be appreciated that the spin daemon 17 may be implemented in the form of a process or thread (generally, "process"), and will essentially be performing a spin-wait operation in connection with the flag 16($n'$)($m'$) associated with the process 12($n'$)($m'$) that issued the flag monitor request. However, the spin daemon 17 can perform these operations in connection with flag monitor requests from a number of processes, in which case only the one process (namely, the process associated with spin daemon 17) will be performing these operations instead of a plurality of processes. Accordingly, spin daemon 17 would not waste any more processor time than would having a single process, such as process 12($n'$)($m'$) described above, perform the spin-wait operations, and it can result in less waste if a number of such processes are waiting for information from other processes.

For example, continuing with the above example, if process $12(n'')(m'')$ is waiting for information from process $12(n')(m')$, and process $12(n''')(m''')$ is waiting for information from process $12(n'')(m'')$, then three processes, namely, processes $12(n')(m')$, $12(n'')(m'')$ and $12(n''')(m''')$ would, in the absence of the spin daemon 17, be performing spin-wait operations waiting for the required information during the time slots in which they are executed. With the use of the spin daemon 17, only one process, namely, that associated with the spin daemon 17 itself, will be performing these operations, and the processes $12(n')(m')$, $12(n'')(m'')$ and $12(n''')(m''')$ will not be scheduled until the information that they require has been provided to them.

In addition, the process for the spin daemon 17 can be executed at a lower priority level, that is, less often, than the processes $12(n)(m)$ of the programs $11(n)$, and, as long as the number of processes $12(n)(m)$ which have not de-scheduled themselves and therefore can be executed is greater than or equal to the number of processors comprising the computer 10, the computer can still make progress in connection with processing of those programs. If the number of processes $12(n)(m)$ which have de-scheduled themselves, and which will not be executed, increases to a point at which the number which can be executed falls below the number of processors, both the processes $12(n)(m)$ that are still executing and the spin daemon 17 will be accommodated by the processors, in which case the spin daemon 17 will be executed more often.

In one embodiment, in which the operating system 14 is in the form of Unix or a Unix-like operating system, the processes $12(n)(m)$ and spin daemon 17 communicate over respective sockets. In that embodiment, each process $12(n)(m)$ initially requests the operating system 14 to establish a socket between it (that is, the process $12(n)(m)$) and the spin daemon 17. After the operating system has established the socket, the process $12(n)(m)$ performs a registration procedure with the spin daemon 17, in which it (that is, the process $12(n)(m)$) provides the spin daemon 17 with its identification and information such as the address of its flag $16(n)(m)$ in the common memory 13, and the spin daemon 17 returns an identifier or handle that the process $12(n)(m)$ can use in flag monitor requests to the spin daemon 17. Since sockets are used as the communication mechanisms between the processes $12(n)(m)$ and spin daemon 17, when the spin daemon 17 has no outstanding flag monitor requests from the processes $12(n)(m)$, it (that is, the spin daemon 17) can de-schedule itself so that the operating system 14 will not enable it to be executed, and, when a process $12(n)(m)$ issues a flag monitor request over its respective socket to the spin daemon 17, the operating system 14 will enable the spin daemon 17 to be executed, at which point the spin daemon 17 can enable the operating system 14 to re-schedule it for execution. Similarly, after a process $12(n)(m)$ has de-scheduled itself as described above, when the spin daemon 17 determines that the condition of its flag $16(n)(m)$ has changed, it (that is, the spin daemon) will transmit a request over the socket, which will enable the operating system 14 to resume execution of the process $12(n)(m)$, which at that point will enable itself to be re-scheduled as described above.

In that same embodiment, the spin daemon 17 also provides, for each flag monitor request which it loads in the spin list 18, a time stamp that identifies the time at which the flag monitor request was received. If the time stamps associated with the flag monitor requests in the spin list 18 indicate that all of them (that is, the flag monitor requests) are relatively old, the spin daemon 17 can determine that it will likely be some time before any of the flags $16(n)(m)$ which it is monitoring is likely to be set. In that case, it can de-schedule itself and establish a timer set to expire after a selected time interval. After the timer expires, the spin daemon 17 will resume execution determine whether any of the flags $16(n)(m)$ which it is monitoring have been set, and, if so enable itself to be re-scheduled and notify the process $12(n)(m)$ associated with the flag(s) $16(n)(m)$ which have been set. On the other hand, if the spin daemon 17 determines that none of the flags $16(n)(m)$ have been set, it can establish another timer and repeat the above-described operation.

A process $12(n)(m)$ can generate a flag monitor request, transmit it to the spin daemon 17 and de-schedule itself immediately after performing one or only a few spin-wait loops. Alternatively, the process $12(n)(m)$ may delay performing these operations for some time. In one embodiment, a process $12(n)(m)$ will generally delay for approximately the time required for the process $12(n)(m)$ to de-schedule itself and reschedule itself, which in one embodiment is on the order of twice the time required for a context switch at the end of a time slot. As a further alternative, a process $12(n)(m)$ may, after performing a selected number of spin-wait loops, give up the remaining portion of its current time slot, and repeat that operation for a selected number of subsequent time slots during which it is executed before generating the flag monitor request, transmit it to the spin daemon 17 and de-schedule itself.

As described above, when the spin daemon 17 determines that a flag $16(n)(m)$ which it is monitoring has been set, it will transmit a message to the process $12(n)(m)$ associated therewith over the respective socket, which, in turn, enables the process $12(n)(m)$ to, in turn, enable itself to be re-scheduled. As an alternative, the spin daemon 17 itself can enable the process $12(n)(m)$ to be re-scheduled. In that case, the spin daemon will not need to transmit the message to the process $12(n)(m)$, and the process $12(n)(m)$ will next be executed when the operating system 14 selects it from the task list 15 for execution.

As further described above, a process $12(n)(m)$ will perform a registration operation in connection with the spin daemon 17 prior to generating a flag monitor request for transmission to the spin daemon 17. A process $12(n)(m)$ may perform a registration operation at any point between the time the process $12(n)(m)$ is executed for the first time and the first time the process $12(n)(m)$ is to transmit a flag monitor request to the spin daemon 17. If a process $12(n)(m)$ waits until the first time it is to transmit a flag monitor request to the spin daemon 17 to perform the registration operation, if the process $12(n)(m)$ never needs to make use of the spin daemon 17, it need not take the time to perform a registration operation.

Figure 2:
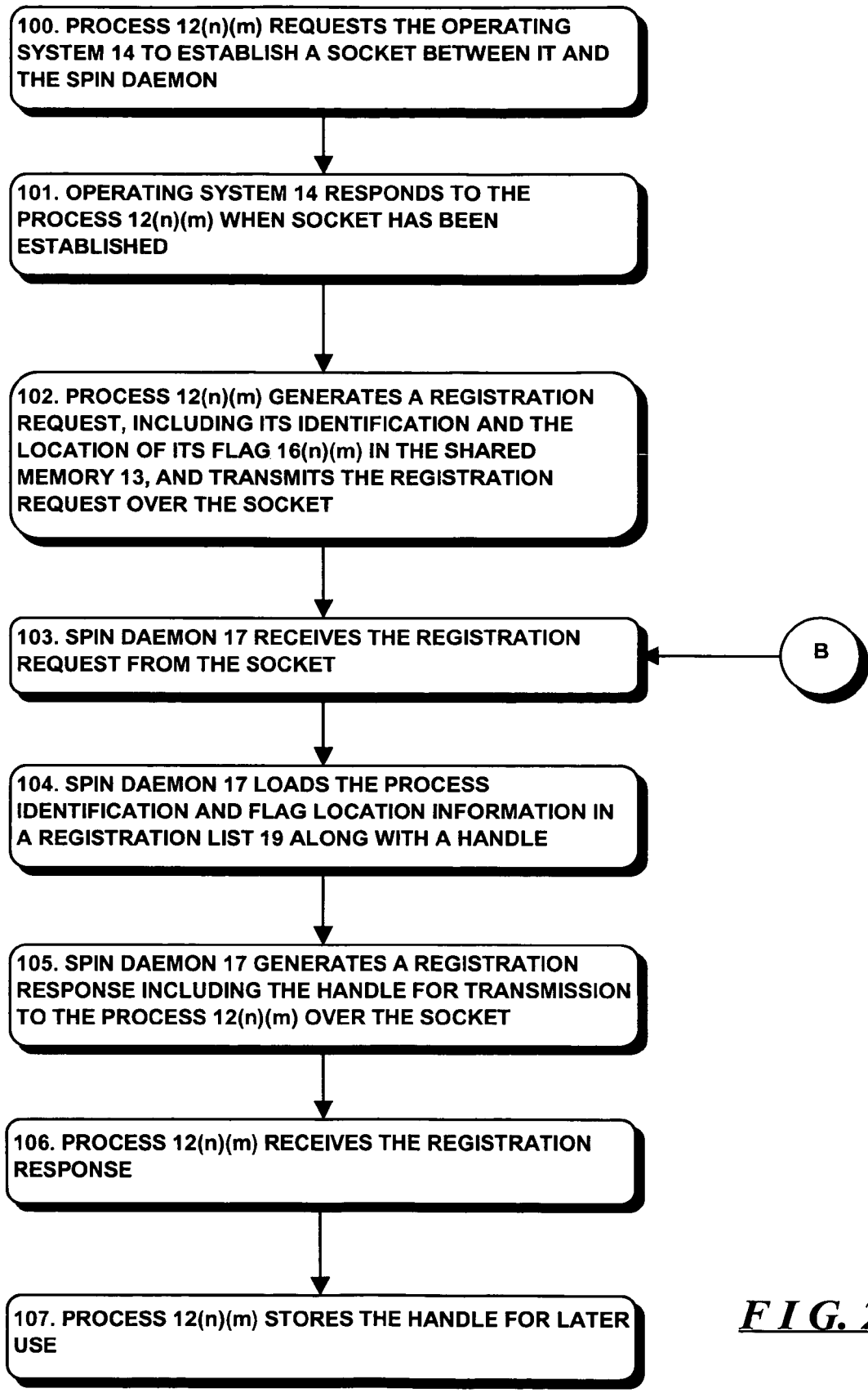
FIG. 2 is a flowchart depicting operations performed by the scheduling control arrangement in the computer depicted in FIG. 1.
Figure 2A:
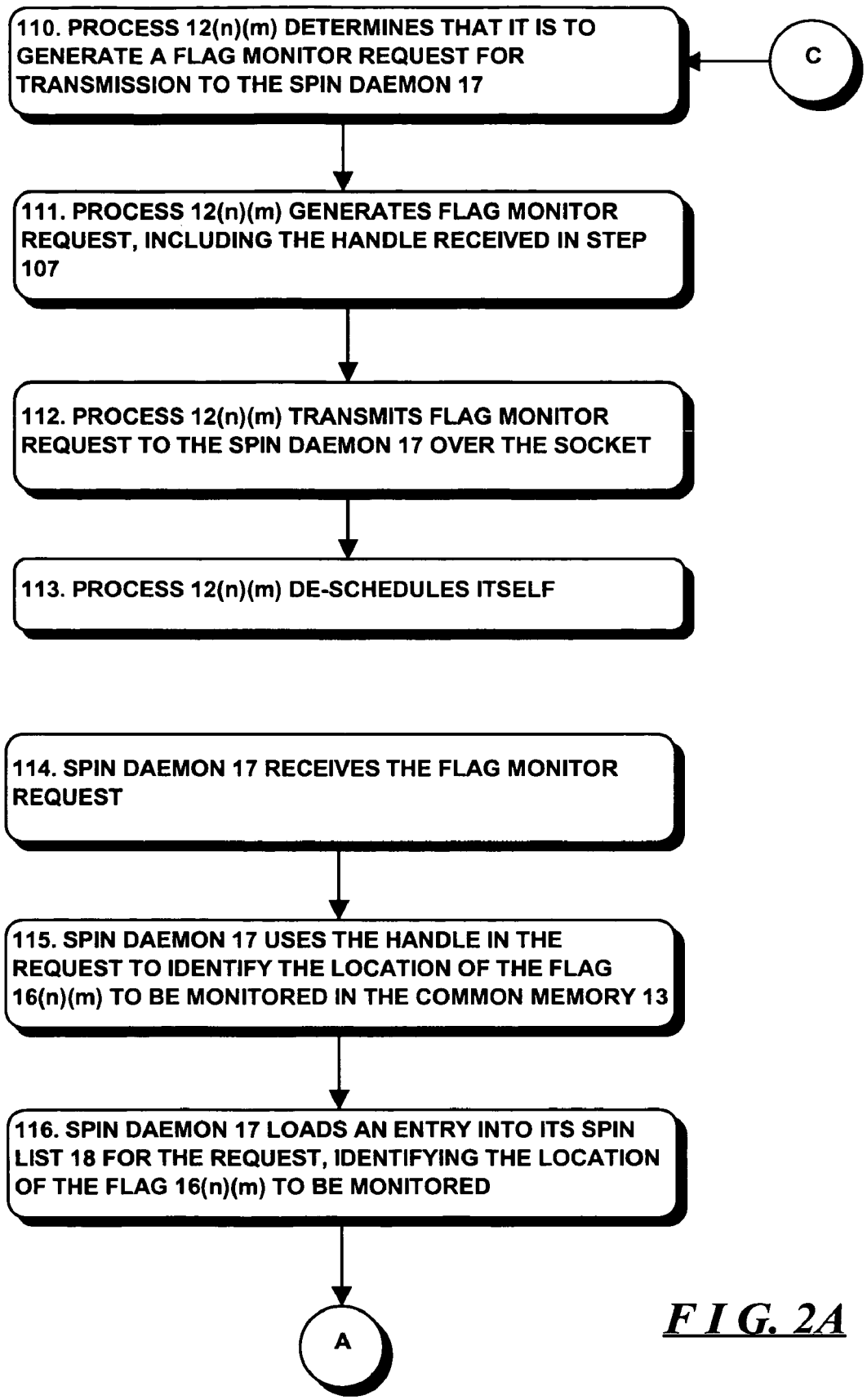

With this background, operations performed by a process $12(n)(m)$ and the spin daemon 17 will be described in connection with the flow chart depicted in FIG. 2. With reference to FIG. 2, the process $12(n)(m)$ first initiates a registration operation with the spin daemon 17. In that operation, the process $12(n)(m)$ initially requests the operating system 14 to establish a socket between it (that is process $12(n)(m)$ and the spin daemon (step 100). After the operating system 14 provides a response to the process $12(n)(m)$ indicating that the socket has been established (step 101), the process $12(n)(m)$ generates a registration request, including its identification and the location of its flag $16(n)(m)$ in the shared memory 13, and transmits the registration request over the socket (step 102). The spin daemon 17 receives the registration request from the socket (step 103), load the process identification and flag location information in a registration list 19 along with a handle (step 104), and generate a registration response including the handle for transmission to the process $12(n)(m)$ over the socket (step 105). The process $12(n)(m)$, in turn, will receive the registration response (step 106) and store the handle for later use (step 107).

After the process 12(*n*)(*m*) receives the handle from the spin daemon 17, if it later determines that it is to generate a flag monitor request for transmission to the spin daemon 17 (step 110), it will generate the flag monitor request, including the handle (step 111), transmit it (that is, the flag monitor request) to the spin daemon 17 over the socket (step 112) and de-schedule itself (step 113). The spin daemon 17, in turn, receives the flag monitor request (step 114), uses the handle in the request to identify the location of the flag 16(*n*)(*m*) to be monitored in the common memory 13 (step 115), and loads an entry into its spin list 18 for the request, identifying the location of the flag 16(*n*)(*m*) to be monitored (step 116).

After the spin daemon 17 has loaded the flag monitor request entry into its spin list 18 in step 116, it (that is, spin daemon 17) will iteratively sequence through the flag monitor request entries in the spin list 18, to determine whether the condition of any of the flags identified therein has changed from the clear condition to the set condition (step 117). If, during processing operations in connection with step 117, the spin daemon 17 receives a registration request from a process (step 118) it will sequence to step 103 to handle the request. Similarly, if, during processing operations in connection with step 117, the spin daemon 17 receives a flag monitor request from a process (step 119), it will return to step 110 to handle the flag monitor request. On the other hand, if, during processing operations in connection with step 117, the spin daemon 17 determines that the condition of one of the flags 16(*n'*)(*m'*) has changed from the clear condition to the set condition (step 120), it (that is, the spin daemon 17) will generate a notification for transmission to the process 12(*n'*)(*m'*) associated with the flag (step 121) and transmit it (that is, the notification) over the socket to the process 12(*n'*)(*m'*) (step 122). Thereafter, the spin daemon 17 can return to step 117 to continue monitoring.

After the process 12(*n'*)(*m'*) receives the notification transmitted in step 122 (step 123), it (that is, the process 12(*n'*)(*m'*), will enable itself to be re-scheduled (step 124) by requesting the operating system 14 to load information into the task list 15 which it (that is, the operating system 14) uses to select processes for execution. Thereafter, at some point in the operating system 14 will select the process 12(*n'*)(*m'*), among other processes which may be listed on the task list, for execution.

The invention provides a number of advantages. In particular, the invention provides a computer that efficiently controls scheduling of execution of processes or threads comprising one or more parallel programs in a compute having a plurality of processors, such as a computer constructed according to a symmetric multi-processor architecture, or a cluster of such computers, when the processes or threads may be waiting for information from other processes or threads.

It will be appreciated that a number of modifications may be made to the computer 10 as described above. For example, although the invention has been described in connection with a single computer, in the form of a symmetric multi-processor, it will be appreciated that the invention may be used in connection with a plurality of such computers interconnected by a network or other communication medium, and particularly if the computers are connected so as to organize their common memories as remote shared memories. In that case, each of the computers can include a respective spin daemon 17 which handles flag monitor requests in connection with processes and threads executing on the respective computer. In accordance with the remote shared memory architecture, the individual common memories of the respective computers are deemed to form a single common memory across all computers, and, when a process on one computer sends information to a process on another computer, a network interface on the one computer will intercept the information and transmit it over the network to the other computer. A network interface on the other computer will then load the information into the portion of the common memory associated with the destination process. Accordingly, a process on the one computer can enable information requested by a process on another and enable the process's flag 16(*n*)(*m*) by performing operations similar to those described above in connection with FIG. 1, and the network interfaces on the two computers will enable the information to be transferred to the other computer and the flag to be set. The spin daemon 17 on the other computer can note that the flag has been set and perform the operations described above to enable the process to be re-scheduled.

Furthermore, although the invention has been described with each process 12(*n*)(*m*) having one flag 16(*n*)(*m*), it will be appreciated that processes 12(*n*)(*m*) may have a plurality of flags whose condition can be monitored by the spin daemon 17. In that case, the processes 12(*n*)(*m*) can register each flag individually and receive a handle therefor from the spin daemon 17 for use as described above. Alternatively, if a process's flags are in a memory segment, and the segment only contains such flags, the process 12(*n*)(*m*) can register the memory segment and receive a handle for the segment. In that case, when the process 12(*n*)(*m*) issues a flag monitor request to the spin daemon 17, the request is actually to monitor the entire segment, and, if a change occurs anywhere in the segment, the spin daemon 17 will enable the process 12(*n*)(*m*) to be re-scheduled, either by directly requesting the operating system 14 or by sending a message to the process 12(*n*)(*m*), which, in turn, can enable itself to be re-scheduled.

In addition, as noted above, in one embodiment, the operating system 14 is a Unix-like operating system. In that embodiment, since each flags 16(*n*)(*m*) may take a number of forms, including an integer, a short- or long-word, or a range of addresses, and the like, and a variety of mechanisms may be used in changing a condition of a flag, in that embodiment the spin daemon 17 is provided with mechanisms which can detect changes in value of the integer, short- or long-word, or the like, from or to a predetermined value, to a predetermined value.

Furthermore, although the invention has been described in connection with processes which communicate using a message passing methodology, it will be appreciated that the invention can be used in connection with processes which communicate using other methodologies.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

The invention claimed is:

1. A system for controlling co-scheduling of processes in a computer comprising at least one process and a spin daemon, the at least one process being configured to, when it is waiting for a flag to change condition, transmit a flag monitor request to the spin daemon and to de-schedule itself by removing an identifier associated with the at least one process from a task scheduling list accessed by an operating system and to notify the operating system of the removal, the spin daemon being configured to, after receiving the flag monitor request monitor the flag and, in response to determining the flag has changed condition, enable the at least one process to be re-scheduled by the operating system for execution by the computer.

2. A system as defined in claim 1 in which said spin daemon is configured to monitor a plurality of flags, each in response to a flag monitor request, the spin daemon maintaining a list identifying those flags it is to monitor, the spin daemon being further configured to, when it receives a flag monitor request, add an identification of a flag associated with the request to the list.

3. A system as defined in claim 2 in which said flags are contained in a memory segment, the spin daemon being configured to enable the at least one process to be re-scheduled following a change of condition of any flag in said memory segment.

4. A system as defined in claim 3 in which said at least one process is configured to register with said spin daemon during registration the at least one process being configured to provide the spin daemon with an identifier for the memory segment, the spin daemon being configured to provide a handle, the at least one process being configured to use the handle in the flag monitor request.

5. A system as defined in claim 1 in which said at least one process and said spin daemon are configured to communicate over a socket.

6. A method of controlling co-scheduling of processes in a computer comprising at least one process and a spin daemon, the method comprising the steps of:
   A. enabling the at least one process to, when it is waiting for a flag to change condition, transmit a flag monitor request to the spin daemon and to de-schedule itself by removing an identifier associated with the at least one process from a task scheduling list accessed by an operating system and notifying the operating system of the removal,
   B. enabling the spin daemon to, after receiving the flag monitor request monitor the flag and, in response to determining the flag has changed condition, enable the at least one process to be re-scheduled by the operating system for execution by the computer.

7. A method as defined in claim 6, the spin daemon being configured to monitor a plurality of flags, each in response to a flag monitor request, the spin daemon maintaining a list identifying those flags it is to monitor, the method including the step of enabling the spin daemon being to, when it receives a flag monitor request, add an identification of a flag associated with the request to the list.

8. A method as defined in claim 7 in which said flags are contained in a memory segment, the method including the step of enabling the spin daemon to enable the at least one process to be re-scheduled following a change of condition of any flag in said memory segment.

9. A method as defined in claim 8 further including the steps of
   A enabling the at least one process to register with said spin daemon, during registration the at least one process being configured to provide the spin daemon with an identifier for the memory segment; and
   B. enabling the spin daemon to provide a handle for use by the at least one process in the flag monitor request.

10. A method as defined in claim 6 further comprising the step of enabling the at least one process and said spin daemon to communicate over a socket.

11. A computer program product for use in connection with a computer to control co-scheduling of at least one process in the computer, the computer program product including a computer readable medium having encoded thereon program instructions comprising:
   A. a process module configured to enable the computer to, when the at least one process is waiting for a flag to change condition, transmit a flag monitor request and de-schedule itself by removing an identifier associated with the at least one process from a task scheduling list accessed by an operating system and notifying the operating system of the removal,
   B. a spin daemon module configured to enable the computer to, after receiving the flag monitor request, monitor the flag and, in response to determining the flag has changed condition, enable the at least one process to be re-scheduled by an operating system for execution by the computer.

12. A computer program product as defined in claim 11 in which said spin daemon is configured to enable the computer to monitor a plurality of flags, each in response to a flag monitor request, the spin daemon enabling the computer to maintain a list identifying those flags it is to monitor, the spin daemon being further configured to enable the computer to, when it receives a flag monitor request, add an identification of a flag associated with the request to the list.

13. A computer program product as defined in claim 12 in which said flags are contained in a memory segment, the spin daemon being configured to enable the computer to enable the at least one process to be re-scheduled following a change of condition of any flag in said memory segment.

14. A computer program product as defined in claim 13 in which said at least one process is configured to enable the computer to register with said spin daemon, during registration the at least one process being configured to enable the computer to provide the spin daemon with an identifier for the memory segment, the spin daemon being configured to enable the computer to provide a handle, the at least one process being configured to use the handle in the flag monitor request.

15. A computer program product as defined in claim 11 in which said at least one process and said spin daemon are configured to enable the computer to communicate over a socket.

16. A system as defined in claim 1, wherein the spin daemon is a low-priority process having a lower processing priority than the at least one process.

17. A system as defined in claim 1, wherein, in response to receiving a notification from the spin daemon, the at least one process is configured to enable itself to be re-scheduled for execution by requesting the operating system to load the identifier into the task scheduling list.

18. A method as defined in claim 6, wherein the spin daemon is a low-priority process having a lower processing priority than the at least one process.

19. A method as defined in claim 6, further comprising, in response to receiving a notification from the spin daemon, enabling the at least one process to enable itself to be re-scheduled for execution by requesting the operating system to load the identifier into the task scheduling list.

20. A computer program product as defined in claim 11, wherein process module is further configured to, in response to receiving a notification from the spin daemon, enable itself to be re-scheduled for execution by requesting the operating system to load the identifier into the task scheduling list.

* * * * *

UNITED STATES PATENT AND TRADEMARK OFFICE
CERTIFICATE OF CORRECTION

| | | |
|---|---|---|
| PATENT NO. | : 7,424,712 B1 | |
| APPLICATION NO. | : 09/303464 | |
| DATED | : September 9, 2008 | |
| INVENTOR(S) | : Steven J. Sistare, Nicholas J. Nevin and Anthony L. Kimball | |

It is certified that error appears in the above-identified patent and that said Letters Patent is hereby corrected as shown below:

Title Page, Delete "(76) Inventors", and insert -- (75) Inventors --.

Title Page, Insert -- (73) Assignee: Sun Microsystems, Inc --.

Signed and Sealed this

Seventeenth Day of March, 2009

JOHN DOLL
*Acting Director of the United States Patent and Trademark Office*